United States Patent [19]
Henty

[11] Patent Number: 5,597,782
[45] Date of Patent: *Jan. 28, 1997

[54] METHOD FOR MICROWAVE PROCESSING OF HIGH TEMPERATURE SUPERCONDUCTORS

[76] Inventor: David L. Henty, c/o Spensley Horn Jubas & Lubitz, Suite 730, 650 Town Center Dr., Costa Mesa, Calif. 92626

[ * ] Notice: The term of this patent shall not extend beyond the expiration date of Pat. No. 5,380,702.

[21] Appl. No.: 370,302

[22] Filed: Jan. 9, 1995

Related U.S. Application Data

[63] Continuation of Ser. No. 532,180, Jun. 4, 1990, Pat. No. 5,380,702, which is a continuation-in-part of Ser. No. 74,896, Jul. 17, 1987, abandoned.

[51] Int. Cl.$^6$ ............... H01B 12/00; H01L 39/12; B29C 35/08; C01B 13/14
[52] U.S. Cl. ............... 505/480; 505/320; 505/325; 505/401; 505/739; 505/742; 505/780; 505/822; 204/157.43; 264/56; 264/66; 252/518; 252/521
[58] Field of Search .................. 505/480, 320, 505/325, 401, 739, 742, 780, 725, 822; 204/157.43; 264/22, 25, 56, 66; 252/518, 521

[56] References Cited

U.S. PATENT DOCUMENTS

| | | | |
|---|---|---|---|
| 4,214,918 | 7/1980 | Gat et al. | 148/1.5 |
| 4,331,485 | 5/1982 | Gat | 148/1.5 |
| 4,490,183 | 12/1984 | Scovell | 148/1.5 |
| 4,529,857 | 7/1985 | Meek et al. | 264/26 |
| 4,581,575 | 4/1986 | Osaki et al. | 324/58.5 |
| 4,784,686 | 11/1988 | Meek et al | 252/518 |
| 4,931,424 | 6/1990 | Henty | 505/1 |
| 5,077,268 | 12/1991 | Clark et al. | 505/1 |

OTHER PUBLICATIONS

Meek et al "Microwave Sintering of Some Oxide Materials Using Sintering Aids" J. Materials Sci. Letters, vol. 6, Jun. 1987 pp. 1060–1062.

Das et al "Microwave Sintering of Ceramics: Can We Save Energy?" Ceramic Bulletin, vol. 66, No. 7, Jul. 1987, pp. 1093–1094.

Djurek et al "Sintering of a Mixed Phase 4–Ba–Cu–O in a Pulsed Electric Field" Europhysics Letters 4(10) pp. 1195–1198, Nov. 1987.

Pals et al, J. Physical Review B, vol. 20, No. 3, Aug. 1, 1979, pp. 935–944.

Baghurst et al, Nature, vol. 332, p. 311, 24 Mar. 1988.

Sastny "Microwave Absorption Studies in High $T_c$ Superconducting Oxides" *Studies of High Temperature Superconductors,* Neva Science Pub. Inc N.Y. 1989 No Page Numbers Available No Month Available.

Clarke et al "Issue in the Processing of Cuprate Ceramic Superconductors" Jour. of the Amer. Ceramics Society, vol. 72, No. 7, pp. 1103–1113, Jul. 1989.

Goodwin "Reagan Hails New Age of Superconductivity . . . " Physics Today, Sep. 1987, pp. 51–54.

Krage, M. "Microwave Sintering of Ferrites" Ceramic Bulletin, vol. 60, No. 11 (1981) pp. 1232–1234 No Month Available.

(List continued on next page.)

*Primary Examiner*—Paul Lieberman
*Assistant Examiner*—M. Kopec

[57] ABSTRACT

A method for improving the phase purity of a multiphase ceramic high temperature superconductor by selective microwave heating of undesired phases in a multiphase material to cause a phase transformation of the undesired phase to the desired phase. The selective microwave heating may be employed during initial firing and sintering of the ceramic superconductor compound or as a subsequent annealing step. Plane polarized microwave energy may be employed to enhance the two dimensional anisotropy of the compound by similar selective heating.

3 Claims, 2 Drawing Sheets

OTHER PUBLICATIONS

"Superconducting Properties of Aligned Crystalline Grains of $Y_1Ba_2Cu_3O_1$" by D. E. Farrell, Physical Review B, V 36, No. 7, pp. 4025–4027. Sep. 1987.

F. Zuo, et al., "Microwave Dissipation in Single Crystal High $T_c$ Superconductors", University of Illinois Preprint, Oct. 1989.

Wu, et al., "Superconductivity at 93K in a New Mixed-Phase Y–Ba–Cu–O Compound System at Ambient Pressure", Physical Review Letters, vol. 58, No. 9, pp. 908–910, Mar. 1987.

Chu, et al., "Evidence for Superconductivity above 40K in the La–Ba–Cu–O Compound System", Physical Review Letters, vol. 58, No. 4, pp. 405–407, Jan. 1987.

Ovshinsky, et al., "Superconductivity at 155K", Physical Review Letters, vol. 58, No. 24, pp. 2579–2581, Jun. 1987.

Hemley, et al., "Single–Crystal Micro–Raman Spectroscopy of Phases in the Y–Ba–Cu–O Superconductor", Physical Review Letters, vol. 58, No. 22, pp. 2340–2342, Jun. 1987.

Yu, et al., "Electronically Driven Instabilities and Superconducitivity in the Layered $La_{2-x}Ba_xCuO_4$ Perovskites", Physical Review Letters, vol. 58, No. 10, pp. 1035–1037, Mar. 1987.

Hor, et al., "Superconductivity above 90K in the Square–Planar Compound System $ABa_2Cu_3O_6+_x$ with A=Y, La, Nd, Sm , Eu, Gd, Ho, Er, and Lu", Physical Review Letters, vol. 58, No. 18, pp. 1891–1894, Apr. 1987.

Dinger, et al., "Direct Observation of Electronic Anistropy in Single–Crystal $Y_1Ba_2Cu_3O_{7-x}$", Physical Review Letters, vol. 58, No.25, pp. 2687–2690, Jun. 1987.

Stipp, "Lab vs. Factory", Wall Street Journal, vol. CXVII, No. 7, Jul. 1987.

Chitre, "Microwave–Assisted Curing of Die Attach Epoxies and Conformal Coatings", Hybrid Circuit Technology, Aug. 1985, Copyright 1985.

Lake Publishing Corporation, Libertyville, Illinois U.S.A. Nevrekar, et al., "Drive Solvents Out of Adhesives with Microwaves", Research & Development, Dec. 1986.

Wilson, et al., "Rapid Annealing Technology for Future VLSI", Solid State Technology, pp. 185–190, Jun. 1985.

METHOD FOR MICROWAVE PROCESSING OF HIGH TEMPERATURE SUPERCONDUCTORS

This is a continuation of application Ser. No. 07/532,180, filed on Jun. 4, 1990, now U.S. Pat. No. 5,380,702 which is a continuation-in-part of application Ser. No. 07/074,896 filed on Jul. 17, 1987 now abandoned.

BACKGROUND OF THE INVENTION

1. Field of the Invention

The present invention relates to high temperature ceramic superconductors. More particularly, the present invention relates to methods of processing such high temperature ceramic superconductors.

2. Background of Related Art

Achievement of superconductivity at high temperature, i.e. temperatures greater than that of liquid nitrogen, is of tremendous technological importance. The number of potential applications for such high temperature superconductors are clearly enormous. Therefore, the announcement of superconductivity at approximately 30K by Bednorz and Muller, *Z. Phys. B.* 64, 189 (1986) in certain lanthanum barium cupric oxide ceramic materials has generated unprecedented excitement and efforts in the scientific, technological and business communities. Following the announcement of the work of Bednorz and Muller, these efforts have generated several significant and rapid increases in the superconductivity onset temperatures. Chu and others have reported superconductivity over 90° K in yttrium barium cupric oxide ceramic compounds. M. K. Wu, J. R. Ashburn, C. J. Torng, P. H. Hor, R. L. Meng, L. Gao, C. J. Huang, Y. Q. Wang, and C. W. Chu, *Phys. Rev. Lett.* 58, 908 (1987), C. W. Chu, P. H. Hor, R. L. Meng, L. Gao, Z. J. Huang and Y. Q. Wang, *Phys. Rev. Lett.* 58, 408 (1987). More recently, superconductivity at 155K with evidence of superconductivity onset above room temperature has been reported. S. R. Ovshinsky, R. T. Young, D. D. Allred, G. DeMaggio, G. A. Van der Leeden, *Phys. Rev. Lett.* 58, 2579 (1987). The latter result involved a multiphase ceramic material of yttrium, barium, copper, fluorine and oxygen.

Despite the tremendous scientific efforts devoted to the study of the new high temperature ceramic superconductors, and despite the significant and rapid series of increases in the superconductivity onset temperature, several key problems have remained without satisfactory solution. Two of the most significant of these problems relate to the lack of phase purity and crystal purity in the structure of the ceramic superconductors.

The first of these problems relates to the presence of two or more distinct, structurally different, phases present in the bulk samples of the high temperature ceramic superconductor material. This first type of phase purity problem is illustrated in a photomicrograph of a polished section of a Y-Ba-Cu-O mixed phase 93K ceramic superconductor as shown in FIG. 1 of R. J. Hemley, H. K. Mao, *Phys. Rev. Lett.* 58, 2340 (1987). Multiphase structure has also been reported in the Y-Ba-Cu-F-O high temperature superconductor compounds of Ovshinsky et al. The differing phases of the ceramic superconductors may be characterized by different crystal structures as well as variations in oxygen site vacancies in the lattice structure, and other differences. The principal problem associated with the multiphase nature of the ceramic superconductors derives from the fact that the differing phases will typically have differing superconducting onset temperatures. For example, in the Y-Ba-Cu-F-O ceramic superconductors reported in Ovshinsky et al., the evidence of superconductivity above room temperature suggests one of the phases in the sample has a superconductivity transition temperature above room temperature, whereas the superconductivity transition temperature of the lowest temperature phase is approximately 155K. Clearly achievement of bulk high temperature superconductivity requires that the desired phase with the highest transition temperature comprise substantially all of the ceramic superconductor material.

The second serious problem relates to the crystal structure alignment of the high temperature ceramic superconductors. This problem derives from the acknowledged two-dimensional nature of the superconductivity in these ceramic superconductors. For example, the two-dimensional nature of the properties of the lanthanum barium cupric oxide ceramic superconductors is discussed in Jaejun Yu, A. J. Freeman, and J-H Xu, *Phys. Rev. Lett.* 58, 1035 (1987). Further evidence of the two-dimensional nature of the superconductivity effect in the ceramic superconductors is provided in P. H. Hor, R. L. Meng, Y. Q. Wang, L. Gao, C. J. Huang, J. Bechtold, K. Forster and C. W. Chu, *Phys. Rev. Lett.* 58, 1891 (1987). In FIG. 1, the two-dimensional structure of certain lanthanum barium cupric oxide superconductors is shown schematically (taken from Hor, et al., *Phys. Rev. Lett.* 58, 1892). The two-dimensional or planar nature of the superconductivity in the high temperature ceramic superconductors has associated with it a high degree of anisotropy in the properties of the superconductors including the current carrying properties, magnetic properties, and others. Due to this anisotropy, a bulk sample with randomly oriented grains of even a single phase ceramic superconductor will have greatly reduced current carrying capacity over a sample with an ideal pure crystal structure or grains with an aligned planar structure. This is due to the necessity of the current to percolate through the randomly oriented planar structures in the bulk material. This source of the current limitations in bulk ceramic superconductors is supported by the announcement by IBM of greatly increased current carrying capacity in meticulously grown single crystal films of ceramic superconductors.

The tremendous technical significance of the above-noted problems is matched, if not equalled, by the commercial significance of the aforementioned problems. See, for example, Wall Street Journal, Jul. 9, 1987, p. 1, col. 1. This article also reports attempts to solve the two-dimensional current carrying problem, including that of IBM, all of which are characterized by meticulous efforts to grow single crystal structures.

Accordingly, at present a great need exists for a method for providing bulk ceramic superconductors with improved phase purity and improved crystal structure alignment.

SUMMARY OF THE INVENTION

The present invention provides a method for increasing the phase purity of multiphase ceramic high temperature superconductors.

The present invention further provides a method for increasing the bulk superconductivity onset temperatures of multiphase type ceramic high temperature superconductors.

The present invention further provides a method for increasing the crystal alignment of high temperature ceramic superconductors.

The present invention provides a method for phase purification of high temperature ceramic superconductors by employing selective microwave heating of a ceramic superconductor to provide selective annealing of the ceramic structure.

In a preferred embodiment, the ceramic superconductor material is selectively heated by microwave energy tuned to a frequency at which the undesired phase or phases of the ceramic material will absorb a higher percentage of the incident microwave energy than the desired phase. The selective microwave heating of the undesired phases is employed during the initial firing and/or sintering of the ceramic material. Such selective heating causes destabilization of the undesired phases as they form during such firing and sintering steps resulting in preferential formation of the desired phase. Some phase purification may also be achieved by use of tuned microwave energy during a selective microwave annealing process after sintering of the material, In another embodiment, microwave energy is employed to heat a multiphase sintered ceramic superconductor commencing at a temperature above the superconducting onset temperature of the undesired phases of the multiphase structure and below the superconducting onset temperature of the desired phase. Due to the decreased microwave absorption properties of the superconducting phase inherent in the superconducting state, the undesired non-superconducting phases will heat much more rapidly by microwave absorption than the desired superconducting phase. The use of relatively high power but relatively short duration microwave heating steps is preferred to enhance heating of the undesired phases before the superconducting phase is heated above its transition temperature by means of thermal conduction. After each microwave heating step, the ceramic material is cooled back to a temperature below the superconductivity transition temperature of the desired phase. During each heating and cooling step the initially much hotter undesired phases will tend to align with the cooler and more stable superconducting phase which will act as a crystal seed or template for nucleation. Thus, after repeated steps the portion of the ceramic material having the desired phase will be significantly increased.

In another embodiment, the present invention provides a method for alignment of the crystal structure of high temperature ceramic superconductors by employing plane polarized microwaves to selectively heat the grains of the ceramic superconductor material depending on the orientation of the two dimensional planar structure of the ceramic grains. The selectively heated grains of the ceramic material will tend to align with the two dimensional planar crystal structure of the cooler grains aligned with the polarized microwaves. Upon repeated application of the polarized microwave heating step, the grains of the ceramic superconductor will tend to align their two dimensional crystal structure in a manner corresponding to the polarization of the microwaves. The selective heating by application of plane polarized microwave energy may also be employed during initial sintering of the ceramic material.

DESCRIPTION OF THE PREFERRED EMBODIMENT

In a preferred embodiment of the present invention, the phase purity of a multiphase ceramic superconductor material is enhanced by selective microwave heating of the ceramic superconductor material. The method of the present invention may be employed as part of an overall processing method for commercial production or small-scale scientific production of ceramic superconductors, or may be employed to improve the characteristics of multiphase ceramic superconductors which have been already prepared.

Figure 1:
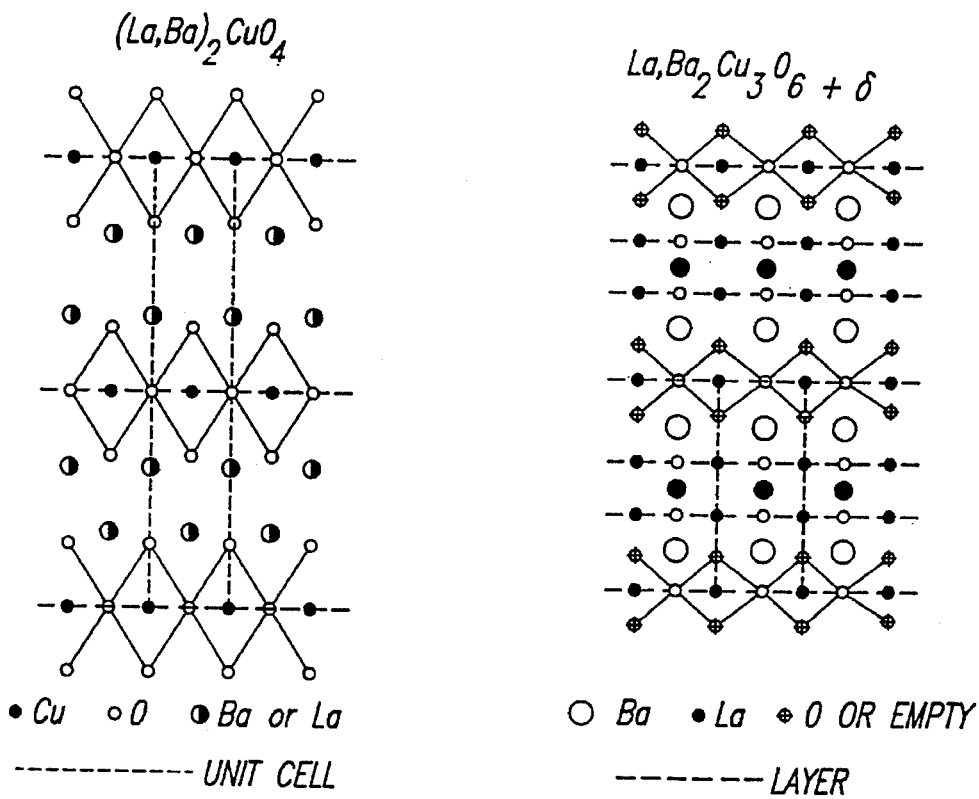
FIG. 1 is a figure schematically illustrating the two dimensional structure of certain lanthanum, barium, cupric oxide superconductors.
Figure 2:
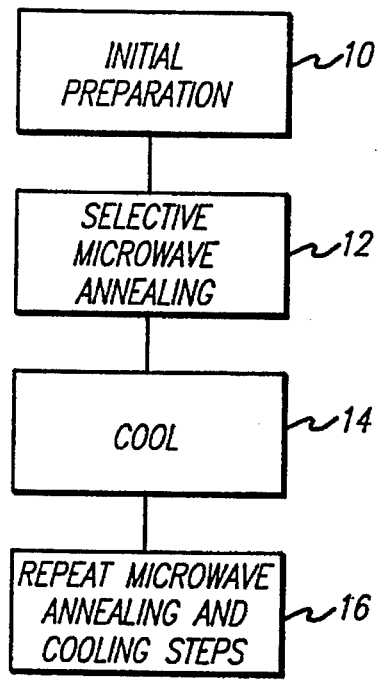
FIG. 2 is a schematic diagram illustrating the steps of one embodiment of the present invention employing selective microwave annealing of a ceramic superconductor.

An embodiment of the present invention for improvement of ceramic superconductors which have already been partially prepared by conventional means will first be described. Referring to FIG. 2, a preferred embodiment for such phase purification is illustrated schematically by boxes representing the various steps involved. The method illustrated by FIG. 2 represents the phase purification as part of an overall process where the initial preparation steps are collectively represented schematically by step 10. The methods employed to prepare various ceramic superconductors presently known have been widely reported and are well known to those skilled in the art. One method commonly employed is to mix powders of the constituent compounds in the appropriate cation ratios. The mixed powders are then heated in the air for several hours, then allowed to cool to room temperature. The resulting mixture is ground, pressed and sintered again at temperatures varying with the specific compound but commonly in the range of 900° C. to 1100° C. Additional annealing of the sample in an oxygen atmosphere is also sometimes employed. Presently preferred compounds are comprised of Y-Ba-Cu-O, Y-Ba-Cu-F-O, or such compounds with substitutions or modifications of the Y or Ba constituents. Since the present invention is applicable to a broad class of ceramic superconductors, however, and since the specific preparation technique for the various known ceramic superconductors varies with the specific material, the initial preparation step 10 is intended to refer generally to formation of all such compounds including those refinements and further developments of techniques now employed.

After the ceramic superconductor is prepared, a microwave annealing step 12 is employed to increase the proportion of the ceramic material having the desired phase of superconductor. The necessity for phase purification may be due to the difficulties in maintaining a single phase during the initial processing step 10 for even relatively small samples, such as in thin film applications, etc., or may be due to difficulties involved in maintaining a single phase structure in a bulk sample, due to uneven heating and/or cooling of the bulk material during sintering or other problems associated with preparing large samples of the ceramic superconductors. During the microwave annealing step 12, microwave energy is applied to the ceramic material with a power and frequency chosen to selectively heat the undesired phases of the ceramic material. Depending on the specific ceramic superconductor material, the difference in microwave absorption characteristics of the desired and undesired phases may be more or less pronounced. Also, the microwave frequency, and the narrowness of the frequency spectrum necessary to enhance this difference in absorption characteristics will vary between specific ceramic superconductor compounds and with temperature. In general, some experimentation will be necessary for the specific ceramic superconductor involved, to determine the optimum microwave frequency and power levels involved. The duration of the microwave annealing step will also vary with the difference in the absorption properties between the desired and undesired phases of the ceramic compound. The determination of optimum frequency and power is a relatively straightforward process of experimentally measuring temperature variation of a pure phase sample of the desired phase of the ceramic superconductor at various microwave frequency and power levels and comparing these values with that of the non-desired phases. The optimum frequency corresponds to the maximum difference between the absorption characteristics of the non-desired phases and that of the desired phase of superconductor. In general, the range of 5 GHz–50 GHz should be examined for such optimum frequency. For compounds where the absorption characteristics of the phases are sufficiently different for a relatively broad range, significant selective annealing may be achieved by merely applying microwave energy without first determining the optimal frequency.

Additionally, for ceramic superconductors having phases with superconductivity at or above room temperature, significant selective absorption of the microwave energy will occur over a broad microwave range due to the inherent properties of the superconducting phase. For example, in the Y-Ba-Cu-F-O superconductors, there is evidence of a phase with superconductivity above room temperature whereas the samples prepared to date have also included phases having transition temperatures much below room temperature. Thus, the application of microwave heating at room temperature will result in enhanced selective absorption of the non-superconducting phases due to the well known properties of superconductors, including zero resistance to induced currents and the presence of a band gap greater than the energy of microwave frequency photons. This selective absorption will continue until the superconducting transition temperature of the high temperature phase is passed by thermal conduction. For relatively high power microwaves, significant selective heating in the undesired phases may thus be achieved without frequency tuning of the microwave energy.

For phase purification of samples having little or no microwave absorption difference between the desired and undesired phases, the material purified is first cooled below the superconducting transition temperature of the desired phase. At this point, the microwave annealing step may be employed, however now relying on the difference in absorption properties between a material in the superconducting state and one in a non-superconducting state.

The duration of the microwave annealing step will vary with the power and difference in absorption characteristics of the desired and undesired phases. The duration should be sufficient to raise the undesired phases above the temperature at which some phase transformation of the undesired phases will occur, but short enough such that thermal conduction into the desired phases will not also raise those phases above the annealing temperature. In this context, the term annealing temperature is used to refer to such temperature sufficient to allow the undesired phases to to undergo a phase transformation to rearrange their crystal structure to match that of the desired phase. The desired phase, due to its selectively lesser absorption of the microwave energy, will be cooler and hence act as a more stable template for growth of the desired phase in the bulk material. The selective microwave annealing step may be maintained by adjusting the power of the microwave energy such that heating of the desired phase by thermal conduction and microwave absorption is reduced such that the temperature of the desired phase is maintained just below the annealing temperature whereas the undesired phases are maintained above the annealing temperature.

After the microwave annealing step 12, the ceramic is allowed to cool as illustrated by step 14 in FIG. 2. The rate of cooling may be made very slow if desired by slowing reducing the power to the microwave source. This may remove some of the thermal stresses put into the material by virtue of the uneven heating.

Depending upon the microwave absorption difference between the desired and undesired phases when the undesired phases reach the annealing temperature, as well as the initial percentage of desired phase in the bulk material, the efficiency of the microwave annealing step will vary considerably. Therefore, the microwave annealing step and cooling steps may be repeated so as to increase the phase purity as illustrated schematically by step 16 in FIG. 2.

In an application where the microwave purification process is employed as part of an overall preparation of the ceramic superconductor, the selective microwave heating step 12 is combined with the firing and/or sintering portion of the initial preparation step 10. In such an embodiment, during firing (and/or sintering) the microwave heating is employed to destabilize the undesired phases in the material. The primary heating for firing may be provided by a conventional kiln with the microwave energy used to provide additional heating fed into the kiln, e.g. by wave guides. Alternatively, the microwave energy may also provide the primary heating as well. While the duration of firing is of necessity such that the sample would be in thermal equilibrium, as nucleation of undesired phases occurs increased absorption and heating will occur thereby destabilizing the new phase. Formation of the desired phase is thus favored. Selective formation of the desired phase may be further enhanced during the cooling stage of the firing or sintering process, by allowing the sample to cool while maintaining power to the microwave source. The portion of the sample fired in the desired phase will cool more rapidly than the undesired phase and will act as a more stable seed for the desired phase in the sample.

Formation of a given phase during firing will be characterized by a preferred temperature range, with the nucleation rate for the phase and the stability of the phase being less for temperature above or below the range. Therefore, preferential formation of the desired phase may also be achieved during firing or sintering by use of microwave energy at a frequency such that the desired phase absorbs such energy at a higher rate than the undesired phase. Such absorption allows preferential nucleation and grain growth where the temperature is otherwise below the preferred temperature range from heating from the primary heat source. In this regard, the primary heat source may be conventional or may be the same, or an additional, microwave source. The latter may be necessary where energy at a different frequency is required, for example, to heat the pre-fired powder to a sufficient firing temperature.

In addition to providing purer phase ceramic superconductor material for increasing the bulk superconductivity onset temperature of the material, the microwave annealing or selective microwave sintering processes described above will result in larger grains of pure crystal structure. The larger grain size will reduce the percolation effect resulting from the two dimensional characteristics of the ceramic superconductors. Accordingly, the current capacity of the ceramic superconductor will also be enhanced.

Figure 3:
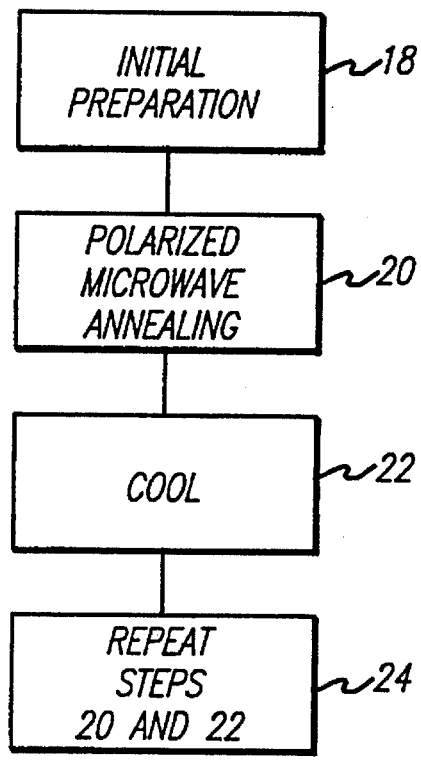
FIG. 3 is a schematic diagram illustrating the steps of a second embodiment of the present invention employing selective microwave annealing of a ceramic superconductor by application of plane polarized microwaves.
Figure 4:
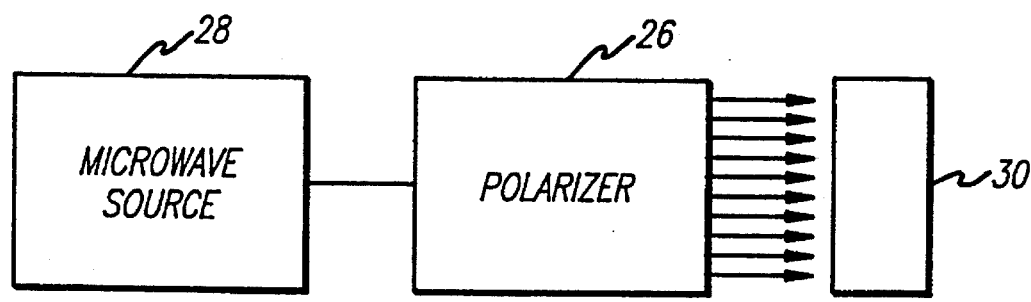
FIG. 4 is a schematic diagram illustrating a system for use in the embodiment of the present invention of FIG. 4 employing plane polarized microwave heating of a ceramic superconductor.

In an alternate embodiment, selective microwave heating may be employed to provide enhanced alignment in the crystal structure of the ceramic superconductor, thereby reducing the current carrying capacity limitations of conventionally prepared ceramic superconductors. FIG. 3 illustrates schematically such method. The steps 18, 20, 22 and 24 correspond generally to steps 10, 12, 14 and 16, described above in relation to FIG. 2, with however the use of plane polarized microwave energy to selectively heat the material during steps 20 and 24. The microwave energy is plane polarized in a direction corresponding to a desired orientation of the two dimensional planar structure of the ceramic superconductor. A system for accomplishing such polarized microwaves is illustrated schematically in FIG. 4. A polarizer 26 is interposed between the microwave source 28 and the sample 30. Such a polarizer may take any of several forms known to those skilled in the art, for example, a rectangular wave guide with the microwave energy fed into the wave guide by means of a probe coinciding with the desired direction of the electric field. Such a wave guide polarization system may require an array of wave guides due to the relatively short wavelengths involved, especially where large samples of material are being selectively heated. For smaller samples, for example thin film materials, the material may be within a waveguide type structure.

Due to the selective absorption of the microwaves by grains with crystal structure not properly aligned with the polarized microwaves, the selective heating of such grains will cause phase transformations to the properly aligned, cooler grain structure. Such selective annealing and alignment will provide an overall orientation to the ceramic superconductor material. The selective microwave heating of non-aligned crystal structures may also be employed during the initial sintering of the material. As discussed above, selective heating during sintering can destabilize the undesired crystal structure and alignment. The primary heat source for sintering may be provided by the polarized microwaves or by a conventional kiln with added microwave heating.

In the specific embodiment directed to achieving increased grain orientation by virtue of polarized microwave processing, conventional heating times and temperatures may be employed by monitoring the temperature of the high temperature superconductor being heated with an optical pyrometer and adjusting the power to the microwave to follow the conventional time/temperature profile. Increased orientation will automatically be achieved by virtue of the preferential absorption of the copper oxide planes which are aligned with the polarized microwave energy. Alternatively, a more rapid heating profile my be employed exploiting the ability of microwave energy to more rapidly heat a sample than a conventional furnace.

As a specific example of the foregoing, an Yttrium-Barium-Copper-Oxide superconductor sample may be synthesized with increased grain orientation employing the time and temperature profiles as set out in Baghurst, et al. *Nature*, Vol. 332, 311 (1988). Specifically, the compounds CuO, $Y_2O_3$ and $(BaNO_3)_2$ are mixed together in the appropriate stoichiometric ratios. The mixture is then heated using plane polarized microwave energy using a microwave energy source such as disclosed in U.S. Pat. No. 4,581,575 to Osaki, et al., the disclosure of which is incorporated herein by reference. The plane polarized microwave source of Osaki, et al. is preferably operated at 2.54 GHz. The sample is heated in air at a power level of 500 W for 5 minutes with the microwave energy source vented to allow any $NO_2$ to escape. The sample is then allowed to cool to room temperature and then reheated for 15 minutes at a power of between 130–500 W, cooled and then reheated again for an additional 25 minutes at the same power setting. Final heating at 25 minutes, followed by a slow cooling in the conventional manner as described in Kinni, et al. *Inorg. Chem.* 26, 1836 (1987) results in the desired orthorhombic superconducting phase with an enhanced alignment over a conventionally processed sample. Alternatively, after the initial heating in air for 5 minutes at 500 W the mixture may be reground prior to the 15 minute heating step and then reground prior to the second two 25 minute heating steps. In the latter case, however, the net increase in grain alignment will be reduced as opposed to the firing without regrinding process.

As another specific example of the process of the present invention for increasing the grain orientation of a ceramic superconductor, an Yttrium-Barium-Copper-Oxide superconductor sample prepared by conventional methods may be provided with increased grain alignment by polarized microwave melt processing. In particular, a conventionally prepared sample of $YBa_2Cu_3O_{7-x}$, prepared for example as described in Jin, et al. *Phys. Rev. B*37, 7850 (1988) is heated in the afore-described polarized microwave energy source of Osaki, et al., operated at 500 W or greater power. The sample is preferably rotated as described in the Osaki, et al. reference, however, with the rotation being less than a full revolution, for example, 355° of arc, with the sample being repeatedly rotated through the 355° of arc during the melt processing. The sample is heated by the microwave energy until partial melting of the sample is visually observed to occur. Alternatively, the sample temperature may be monitored by an optical pyrometer until approximately 1200° C. is reached. The sample is then allowed to cool slowly back to room temperature.

Although plane polarized microwave energy, with rotation of the sample during melt processing is preferably employed, significant advantages may also be achieved by using unpolarized microwave energy at high powers, for example, 2000 W or greater of microwave energy, since absorption will naturally be preferential due to the relatively low absorption by copper oxide planes forming an angle with respect to the direction of propagation of the microwave beam.

Additionally, the present invention may provide polarized microwave melt processing of other ceramic superconductors, such as Bismuth-Lead-Stronium-Calcium-Copper-Oxide superconductors. For processing of such materials, the temperature process steps may follow Moon, et al. *Appl. Phys. Lett.* 55(14), 1466 (1989), the disclosure of which is incorporated herein by reference.

It will be appreciated by those skilled in the art that many variations in the aforedescribed preferred embodiments are possible while remaining within the scope of the present invention. For example, several aspects of the present invention have applications to a wide range of ceramic materials beyond presently known ceramic superconductors. Accordingly, the scope of the present invention should not be limited to the preferred embodiments described above.

What is claimed is:

1. A method for preparing a high temperature ceramic superconductor material, comprising the steps:

mixing together powders of the constituent compounds in desired cation ratios, the constituent compounds including Cu and O;

heating said mixture by application of microwave energy to thereby heat said mixture to a processing temperature sufficient to form a superconducting ceramic material; and cooling the compound from said processing temperature.

2. A method as set out in claim 1, further comprising the step of maintaining microwave heating of said compound during said cooling step.

3. A method as set out in claim 1, wherein the primary heating source during said heating step is provided by a source other than said source of microwave energy.

* * * * *